United States Patent
Lei

(10) Patent No.: US 11,988,320 B2
(45) Date of Patent: May 21, 2024

(54) SHOOTING STAND WITH BALANCING WEIGHT

(71) Applicant: Dongguan City GeShengMei Industrial Co., Ltd, Dongguan (CN)

(72) Inventor: Taotao Lei, Dongguan (CN)

(73) Assignee: DONGGUAN CITY GESHENGMEI INDUSTRIAL CO., LTD., Dongguan (CN)

( * ) Notice: Subject to any disclaimer, the term of this patent is extended or adjusted under 35 U.S.C. 154(b) by 0 days.

(21) Appl. No.: 18/185,302

(22) Filed: Mar. 16, 2023

(65) Prior Publication Data

US 2023/0220949 A1 Jul. 13, 2023

(30) Foreign Application Priority Data

Nov. 18, 2022 (CN) .......................... 202223072496.2

(51) Int. Cl.
*F16M 11/18* (2006.01)

(52) U.S. Cl.
CPC ......... *F16M 11/18* (2013.01); *F16M 2200/04* (2013.01)

(58) Field of Classification Search
CPC ............... F16M 11/18; F16M 2200/04; F16M 2200/041; F16M 2200/042; F16M 2200/044
See application file for complete search history.

(56) References Cited

U.S. PATENT DOCUMENTS

| | | | | | |
|---|---|---|---|---|---|
| 95,879 | A | * | 10/1869 | Bunnell | B66C 23/36 212/241 |
| 1,887,637 | A | * | 11/1932 | Hansen | F16M 11/42 381/362 |
| 2,036,097 | A | * | 3/1936 | Pieper | A61B 6/447 378/197 |
| 4,021,019 | A | * | 5/1977 | Sanders | B63B 27/10 254/281 |
| 4,460,148 | A | * | 7/1984 | Sasaki | B66C 23/005 248/585 |
| 5,454,042 | A | * | 9/1995 | Drever | F16M 11/10 381/361 |

(Continued)

FOREIGN PATENT DOCUMENTS

| CN | 210179238 U | 3/2020 | |
|---|---|---|---|
| CN | 211821417 U | 10/2020 | |
| WO | WO-0175353 A1 * | 10/2001 | ............. F16M 11/10 |

*Primary Examiner* — Eret C McNichols
(74) *Attorney, Agent, or Firm* — SHIMOKAJI IP

(57) ABSTRACT

A shooting stand with a balancing weight includes a standing frame, a top base, an installing support, a telescopic member, a guide wheel, a rope and a balancing rod. The balancing rod is hinged with the top base, and the balancing rod is extended along a direction away from the top base, the rope goes around the guide wheel, one end of the rope is connected to the telescopic part or the installing support, and the other end is connected to the balancing rod away from the top base. When the telescopic part is extended, the rope is pulled to cause the balancing rod to pivot to approach the cantilever arm; when the telescopic part is retracted, the rope is loosened to cause the balancing rod to pivot away from the cantilever arm, and the rope is pulled to move again. The stability and reliability are improved.

10 Claims, 7 Drawing Sheets

(56) References Cited

U.S. PATENT DOCUMENTS

| | | | |
|---|---|---|---|
| 6,705,773 B2* | 3/2004 | Fix | F16M 11/2064 |
| | | | 396/419 |
| 7,037,006 B2* | 5/2006 | Chapman | F16M 11/42 |
| | | | 396/428 |
| 7,845,622 B1* | 12/2010 | Riggs | B66C 23/44 |
| | | | 254/326 |
| 7,931,412 B2* | 4/2011 | Brown | F16M 11/2035 |
| | | | 396/421 |
| 8,142,083 B2* | 3/2012 | Brown | F16M 11/2035 |
| | | | 396/421 |
| 8,576,553 B2* | 11/2013 | Myerchin | F16M 11/046 |
| | | | 248/123.2 |
| 8,910,913 B2* | 12/2014 | Hirose | A61B 1/00149 |
| | | | 606/1 |
| 9,046,213 B2* | 6/2015 | Huang | F16M 11/18 |
| 9,623,270 B2* | 4/2017 | Palet | A62B 35/0068 |
| 10,179,598 B1* | 1/2019 | Goodbinder | H05K 5/0234 |
| 11,083,917 B2* | 8/2021 | Saygivar | E04G 21/3204 |
| 11,230,000 B2* | 1/2022 | Kemp | B25J 11/008 |
| 11,266,482 B2* | 3/2022 | Chang | A61B 6/447 |
| 11,697,445 B2* | 7/2023 | Leblanc | B66C 23/36 |
| | | | 414/630 |
| 2021/0088632 A1* | 3/2021 | Bentsen | F16M 11/123 |
| 2021/0139063 A1* | 5/2021 | Leblanc | B66C 23/18 |
| 2023/0120143 A1* | 4/2023 | Pichler | A61B 90/50 |
| | | | 248/274.1 |
| 2023/0175635 A1* | 6/2023 | Rui | F16M 13/02 |
| | | | 248/125.2 |
| 2023/0265963 A1* | 8/2023 | Unger | F16M 11/2014 |
| | | | 248/575 |

* cited by examiner

SHOOTING STAND WITH BALANCING WEIGHT

FIELD OF THE INVENTION

The application relates to the technical field of shooting equipment, in particular to a shooting stand with a balancing weight which is used in occasions such as outdoor activities, parties, gathering etc. to shoot a selfies photo or video.

BACKGROUND OF THE INVENTION

Shooting apparatus with cameras including smart phones, tablet PCs, digital cameras etc. are widely used in occasions such as outdoor activities, parties, gathering etc. to shoot photos and video.

In order to realize the selfies, the use of a shooting stand is necessary. Normally, the shooting apparatus is detachably assembled on the shooting stand, which is adjustable to obtain a desired angle and height thereof, and then is controlled through wire or wireless control to shoot scenes from different angles and motion effects.

In the existing shooting stand, it mainly includes a standing frame for standing on the ground, a top base fixed on the top of the standing frame, an installing support for connecting with the shooting apparatus, and an electric push rod for adjusting the position of the installing support. The electric push rod is placed horizontally on the top of the standing frame, the telescopic part of the electric push rod is connected with the installing support, and the main part of the electric push rod is fixed connected with the top base. In such a configuration, the telescopic part may be extended relative to the main part, thereby actuating the installing support together with the shooting apparatus to slide, to achieve the purpose of adjusting the shooting apparatus in a suitable position.

However, in the process of sliding of the telescopic part, the installing support and the shooting apparatus, the load distribution on both sides of the standing frame is changed in real time, as a result, the load difference on both sides of the standing frame is great. Especially when the telescopic part is in the maximum extension position, the load on the side of the installing support is much greater than that on the side of the main part. As a result, the stability of the standing frame is poor to bring shaking, thus reducing the shooting effect of the shooting apparatus.

Therefore, there is an urgent need for a shooting stand with a balancing weight to overcome the above defects.

SUMMARY OF THE INVENTION

An objective of the present application is to provide a shooting stand with a balancing weight, which ensures uniform load distribution on both sides of the standing frame to stabilize the standing frame.

To achieve the above objective, the present application provides a shooting stand with a balancing weight, comprising a standing frame, a top base assembled on the standing frame, an installing support for connecting with an external shooting apparatus, and a telescopic member, the telescopic member comprising a fixed part and a telescopic part on the fixed part, the fixed part being installed on the top base, and extended out of the top base along an opposite direction of the telescopic part to form a cantilever arm, the telescopic part being extended out of the top base and connected with the installing support. The shooting stand further comprises a guide wheel, a rope and a balancing rod, the guide wheel is assembled on the cantilever arm, an end of the balancing rod is hinged with the top base, and the balancing rod is extended along a direction away from the top base and arranged beneath the cantilever arm, the rope goes around the guide wheel, one end of the rope is connected to the telescopic part or the installing support, and the other end of the rope is connected to the balancing rod away from the top base. When the telescopic part is extended and slid relative to the fixed part, the rope is pulled to cause the balancing rod to pivot and swing to approach the cantilever arm; when the telescopic part is retracted relative to the fixed part, the rope is loosened to cause the balancing rod to pivot or swing away from the cantilever arm under an action of a dead weight thereof, and the rope is pulled to move while the balancing rod is pivoted or swung away from the cantilever arm.

In one embodiment, the guide wheel is configured toward the balancing rod, the balancing rod has a mounting part toward the cantilever arm for mounting the rope, the rope goes around and above the guide wheel, the rope is located between the installing support and the guide wheel and is parallel with the telescopic member, and the top base is provided with a passage for allowing the rope to pass.

In one embodiment, the guide wheel is located at an end of the cantilever arm away from the top base, and the guide wheel is arranged in a fixed or rolling manner.

In one embodiment, a balancing weight is provided at a position of the balancing rod where is away from the top base.

In one embodiment, the balancing weight is slidable on the balancing rod, and a fixing screw is provided on the balancing weight by which a position of the balancing weight can be fixed or adjusted.

In one embodiment, the top base comprises a first base and a second base which is operable to pivot relative to the first base, the first base is fixed on a top of the standing frame, the fixed part is connected with the second base, the end of the balancing rod is hinged with the second base, and the second base is provided with a passage for allowing the rope to pass.

In one embodiment, an angle adjusting assembly is provided between the telescopic part and the installing support, and the angle adjusting assembly comprises a first fitting piece and a second fitting piece, the first fitting piece is fixed at an end of the telescopic part, the second fitting piece is connected to the installing support, and the end of the rope is connected to the first fitting piece.

In one embodiment, the standing frame comprises a telescopic rod and a tripod for supporting the telescopic rod, the telescopic rod has a main part and a sliding part on the main part, the top base is connected with the sliding part, and the tripod is connected with the main part.

In one embodiment, both of the telescopic rod and the telescopic member are electric push rods, and a box for installing a battery and a controller is provided at the fixed part near the top base, and the box is electrically connected with the electric push rods.

In one embodiment, the tripod is a folding tripod, when unfolded, the tripod is deployed away from the main part and arranged around a center of the main part; when folded, the tripod moves close to the main part.

In comparison with the prior arts, the guide wheel is provided on the cantilever arm, the end of the balancing rod is hinged with the top base and extended in the direction away from the top base and beneath the cantilever arm, the rope goes around the guide wheel, and one end of the rope is connected with the telescopic part or the installing support, and the other end of rope is connected with the position of balancing rod away from the top base. In such a configuration, when the telescopic part is extended and slid relative to the fixed part, the rope is pulled to cause the balancing rod to pivot and swing to approach the cantilever arm; when the telescopic part is retracted relative to the fixed part, the rope is loosened to cause the balancing rod to pivot or swing away from the cantilever arm under an action of a dead weight thereof, and meanwhile the rope is pulled tightly again due to the movement of the balancing rod. In such a way, the load on both sides of standing frame can be balanced through the pivoting position of the balancing rod, which effectively ensures the uniform load on both sides of standing frame, thereby stabilizing the standing frame to ensure the shooting effect of the shooting apparatus.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

In order to make the purpose, technical solutions and advantages of the present application more clearly understood, the present application will be described in further detail below with reference to the accompanying drawings and embodiments.

Figure 1:
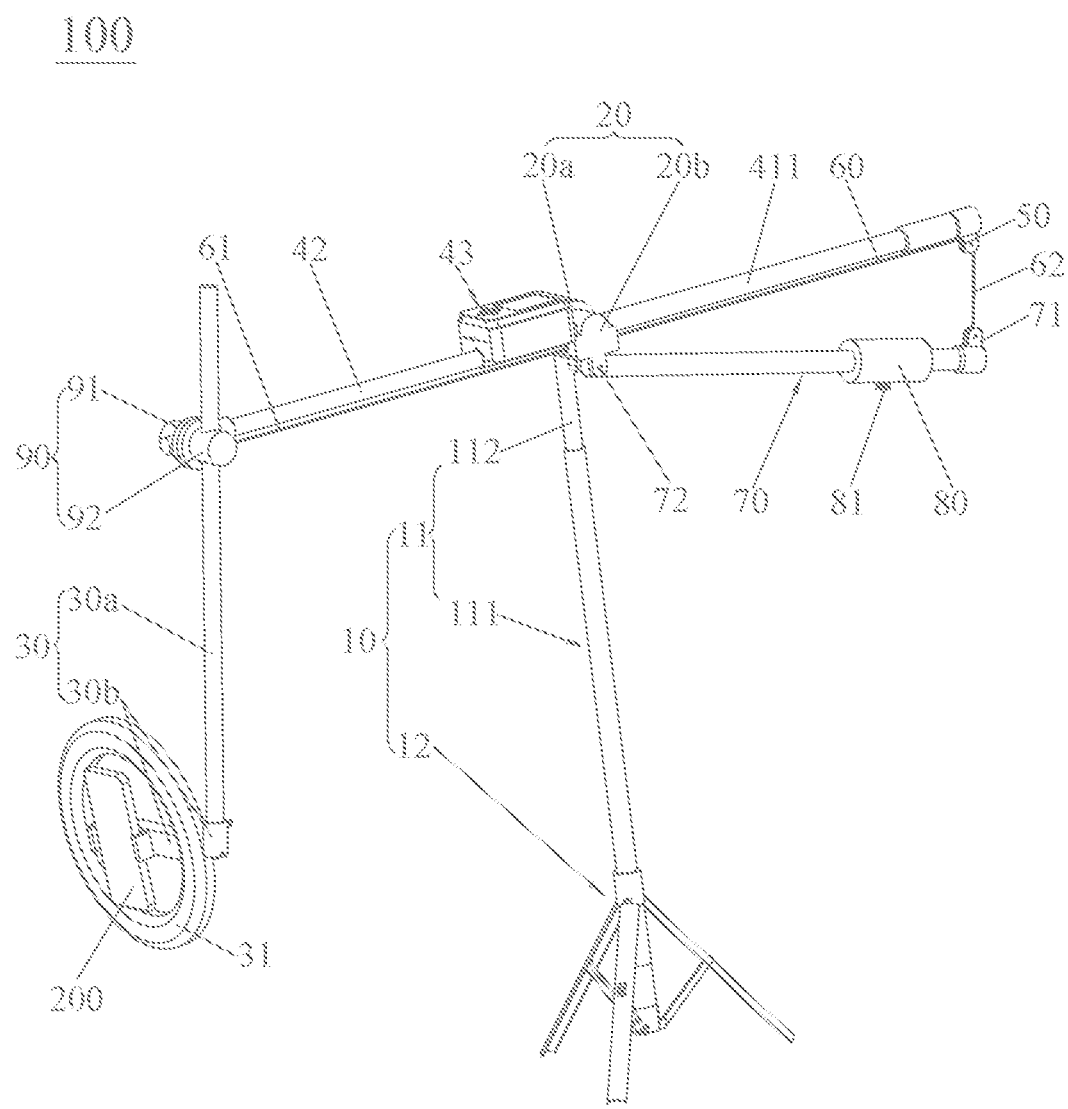
FIG. 1 is a perspective view of a shooting stand with a balancing weight according to one embodiment of the invention, wherein the support is in folded status, and the telescopic part is in the maximum extension position.
Figure 2:
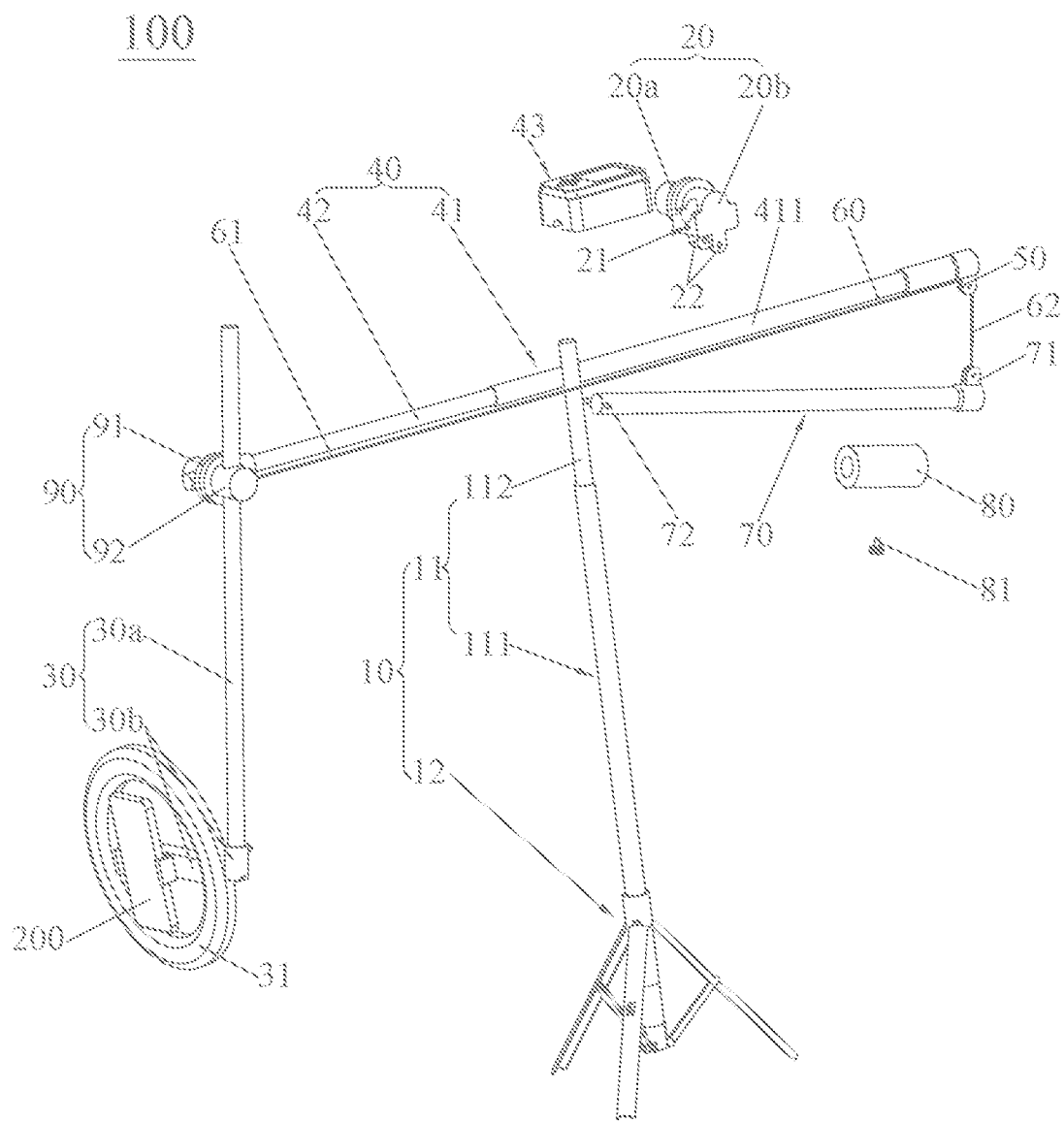
FIG. 2 is an exploded perspective view of a shooting stand with a balancing weight according to one embodiment of the invention.
Figure 3:
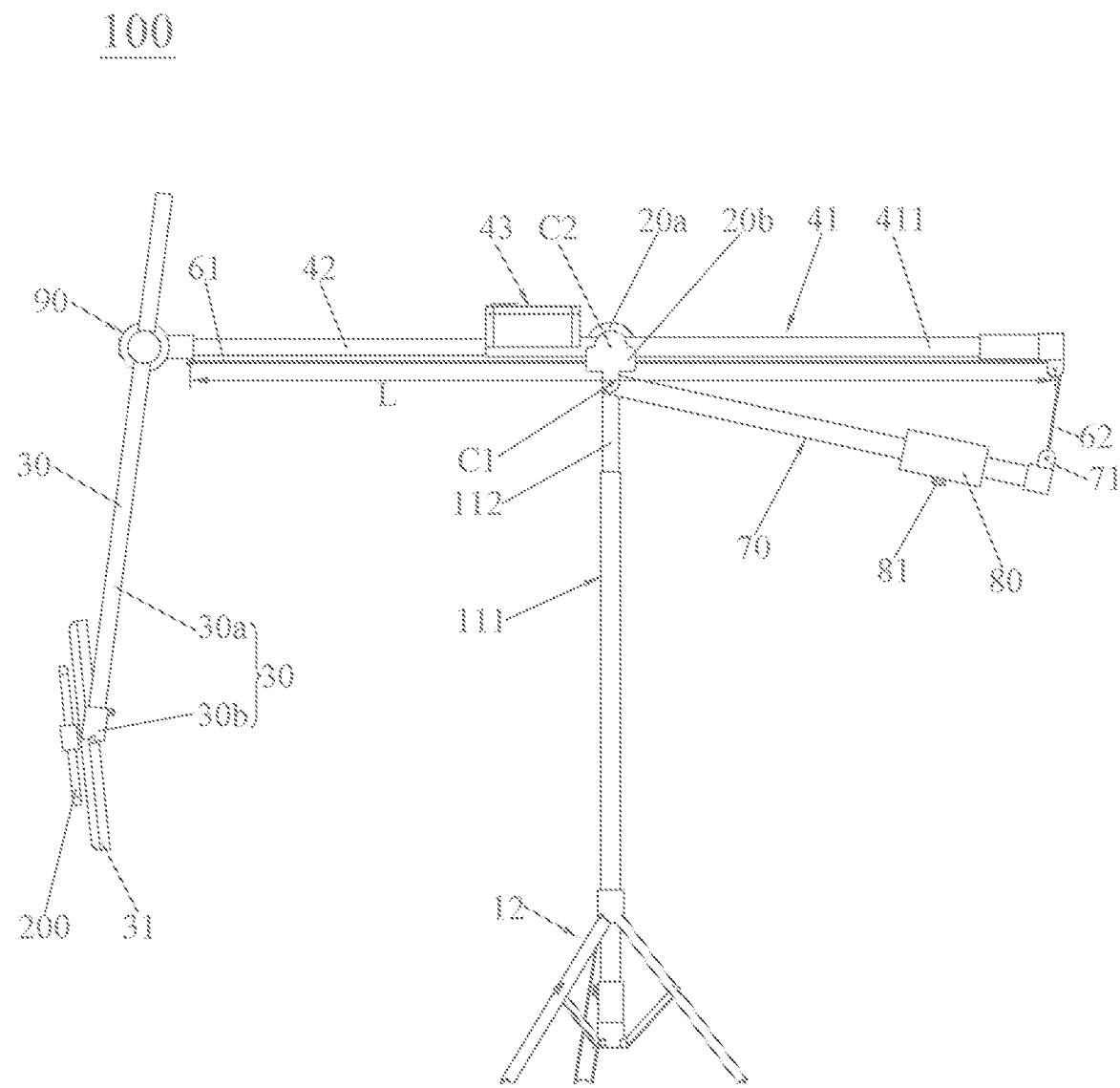
FIG. 3 is a plane view of the shooting stand as shown in FIG. 1 along the direction pointed by the arrow inside the box.
Figure 4:
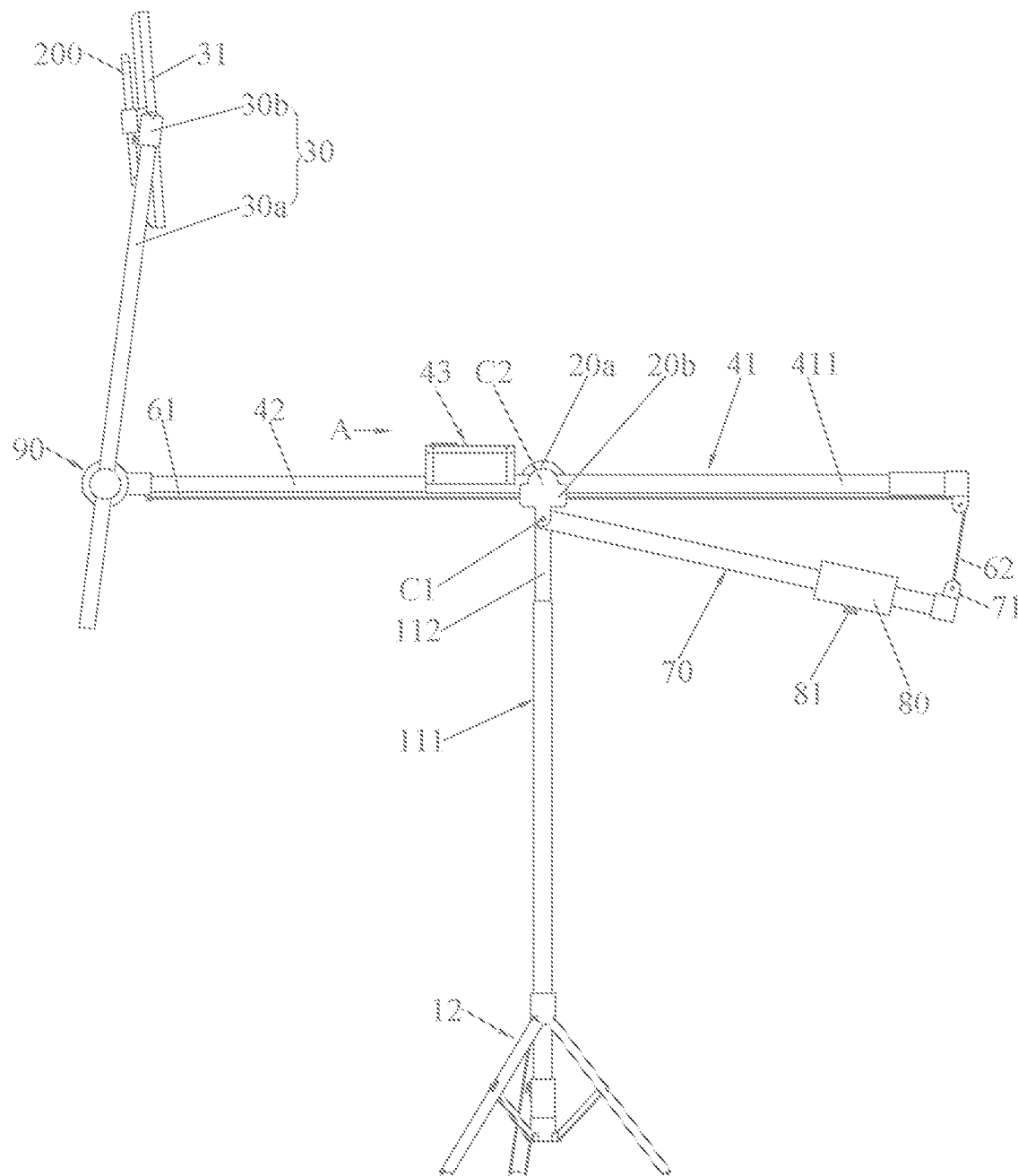
FIG. 4 illustrates a state that the installing support together with the shooting apparatus are turned to the top.
Figure 5:
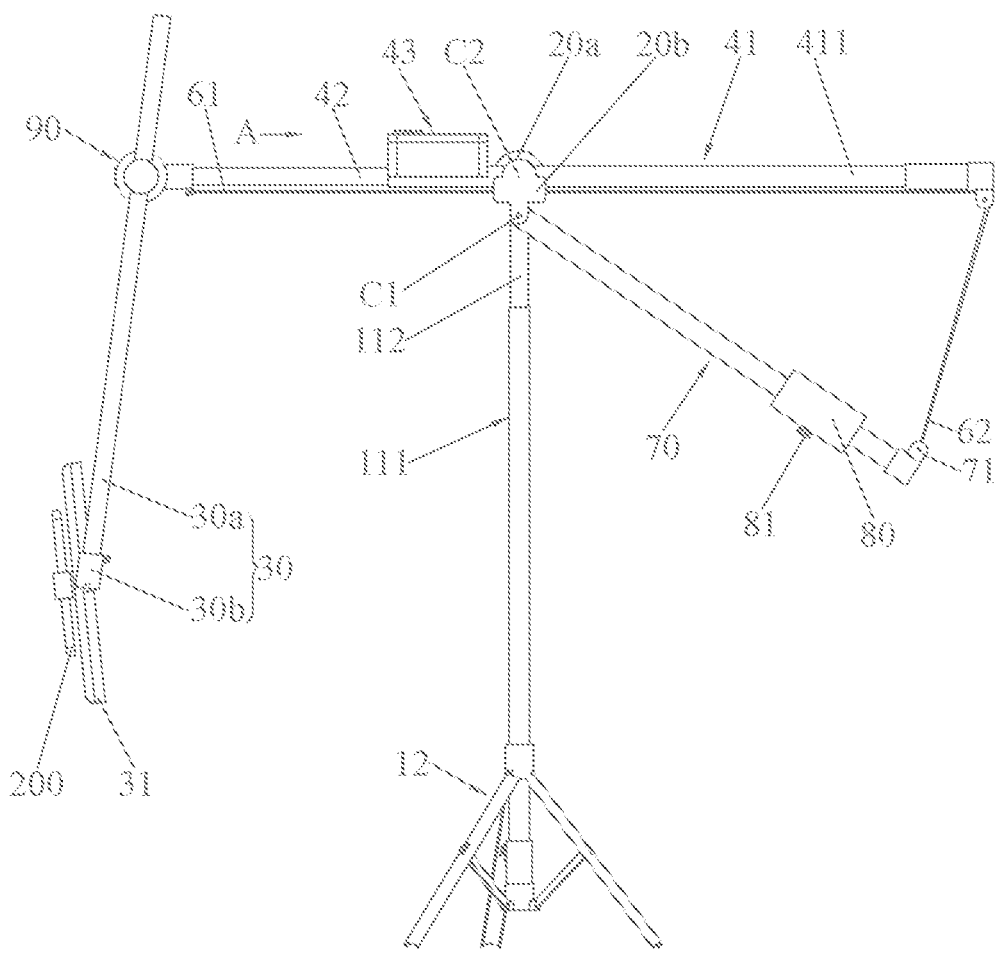
FIG. 5 illustrates a status that the telescopic part is retracted along the arrow A to the preset position, and the balancing rod is pivoted downward at a certain angle.

Referring to FIGS. 1-3, the shooting stand 100 with a balancing weight of the present application includes a standing frame 10, a top 20, an installing support 30, a telescopic member 40, a guide wheel 50, a rope 60, and a balancing rod 70. By means of the standing frame 10, the shooting stand 100 may stand in the environment when in use. The top base 20 is assembled on and supported by the standing frame 10. Optionally, as an example, the top base 20 is fixed on the top of the standing frame 10, so as to effectively use the height size of the standing frame 10. The top base 20 may be fixed on other positions of the standing frame 10 as needed, which is not limited to that shown the figures. The installing support 30 is used for connecting with an external shooting apparatus 200. The shooting apparatus 200 may be fastened on the installing support 30, by clamps for example, to prevent accidental loosening. As an embodiment shown in FIGS. 1-7, the shooting apparatus 200 may be a smart phone with a camera, optionally, it may be a tablet computer with a camera or a digital camera, which is not limited here.

The telescopic member 40 includes a fixed part 41 and a telescopic part 42 on the fixed part 41. The fixed part 41 is installed on the top base 20, in such a way, the telescopic member 40 is steadied and supported by the top base 20. Further, the fixed part 41 is extended out of the top base 20 along an opposite direction of the telescopic part 42 (the arrow A in FIGS. 4 and 5) to form a cantilever arm 411 that is suspended. The telescopic part 42 is extended out of the top base 20 and connected with the installing support 30. In such a way, the telescopic part 42 is connected to the installing support 30 and the shooting apparatus 200, so that the telescopic part 42 together with the installing support 30 and the shooting apparatus 200 may be extended and slid relative to the fixed part 41.

Further, the guide wheel 50 is assembled on and supported by the cantilever arm 411. Optionally, the guide wheel 50 is arranged in a rolling manner, so that a rolling friction that is less resistance is generated between the guide wheel 50 and rope 60. Optionally, the guide wheel 50 may be in a fixed arrangement as needed, at that condition, a sliding friction is generated between the guide wheel 50 and rope 60, and accordingly, the guide wheel 50 installed at the cantilever arm 411 may or may not roll.

As shown, one end of the balancing rod 70 is hinged with the top base 20, and the other end is extended along a direction away from the top base 20 and arranged beneath the cantilever arm 411, so that the balancing rod 70 may be pivoted and swingable around the top base 20 to be closed to or away from the cantilever arm 411. Alternatively, as an embodiment, in FIG. 2, the top base 20 has two lugs extending downward, spaced side by side with each other. The end of the balancing rod 70 is configured between the two lugs 22, a hinged pin 72 is drilled through the two lugs 22 and the end of the balancing rod 70, so that the hinge between the balancing rod 70 and the top base 20 is reliable and compact, thereby reducing the occupied space. Optionally, the end of the balancing rod 70 and the top base 20 may be hinged in other ways, which is not limited to that shown in FIG. 2.

Specifically, the rope 60 is assembled on the guide wheel 50, and one end 61 is connected with the telescopic part 42. Optionally, one end 61 of the rope 60 may be connected with the installing support 30, and the other end 62 of the rope 60 is connected with the balancing rod 70 far away from the top base 20. As an embodiment shown in FIG. 1 and FIG. 2, the rope 60 goes around the guide wheel 50 and above the guide wheel 50. The part of rope 60 located between the installing support 30 and the guide wheel 50 (i.e., the part defined by L in FIG. 3) is arranged parallel with the telescopic member 40, so that the rope 60 may be pulled reliably during the sliding of the telescopic part 42, thereby avoiding that the pulling direction of the rope 60 deviates from the sliding direction of the telescopic part 42.

Figure 6:
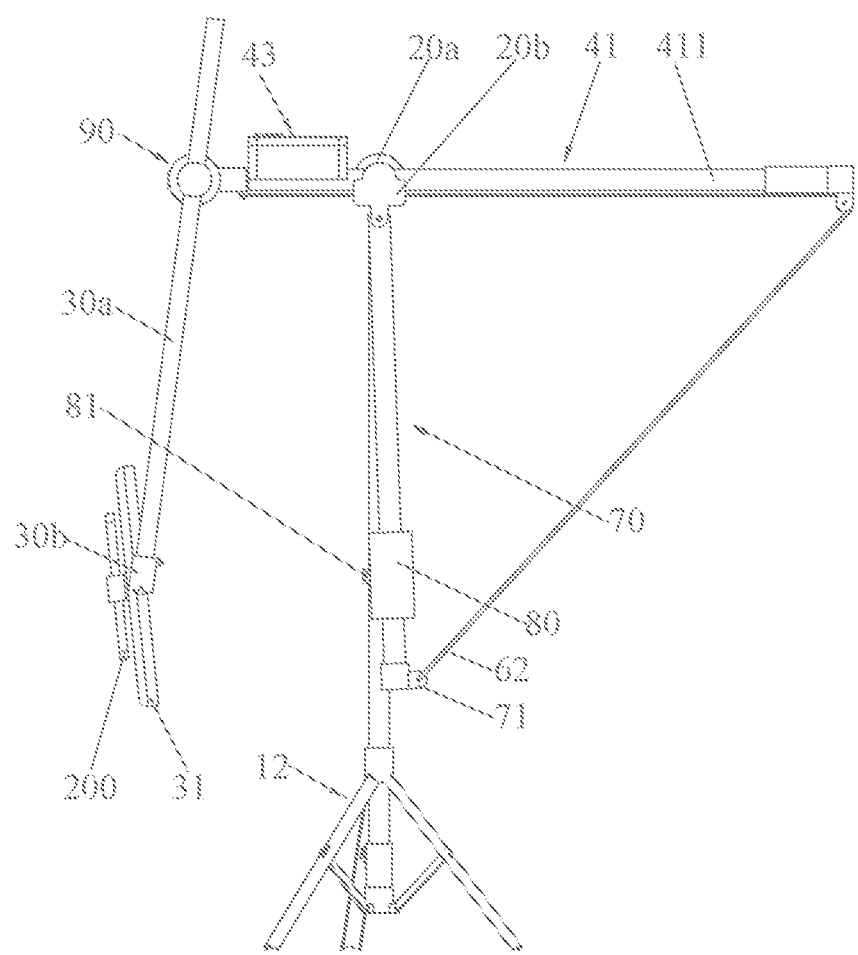
FIG. 6 illustrates a state that the telescopic part is retracted along the arrow A to the limit position, and the balancing rod is pivoted downward to the limit position.

During the extending and sliding of the telescopic part 42 relative to fixed part 41, the rope 60 is pulled to cause the balancing rod to pivot and swing to approach the cantilever arm 411. When the telescopic part 42 is in the maximum extension position, the balancing rod 70 is in the position closest to cantilever arm 411, as shown in FIG. 3. When the telescopic part 42 is retracted relative to the fixed part 41, the rope 60 is loosened to cause the balancing rod 70 to pivot or swing away from the cantilever arm 411 under the action of its dead weight. At the same time, the rope 60 is moved and pulled during the swinging of the balancing rod 70. When the telescopic part 42 is in the maximum retraction position, the balancing rod 70 is the furthest away from the cantilever arm 411, as shown in FIG. 6.

More specifically, as shown in FIGS. 1-6, the guide wheel 50 is configured towards the balancing rod 70. The balancing rod 70 has a mounting part 71 toward the cantilever arm 411 for installing the rope 60. Optionally, the mounting part 71 is a lug where the rope 60 may be wound and fixed. The top base 20 is provided with a passage 21 for allowing the rope 60 to pass, with the help of the passage 21, the rope 60 may only move along the extending direction of the telescopic part 42, thus the stability and reliability of the rope movement is ensured since the moving direction of the rope 60 is constrained by the top base 20. Specifically, in FIG. 1 to FIG. 6, as an embodiment, the guide wheel 50 is positioned at the end of cantilever arm 411 away from top base 20 to effectively utilize the length of cantilever arm 411. In addition, a balancing weight 80 is provided at a position of the balancing rod 70 where is away from the top base 20, to increase the weight of the balancing rod 70. Optionally, the balancing weight 80 may be slidable on the balancing rod 70, and a fixing screw 81 is provided on the balancing weight 80 by which the position of the balancing weight 80 on the balancing rod 70 may be fixed or adjusted. By this token, the counterweight on the balancing rod 70 is adjustable with the help of fixing screw 81 and balancing weight 8, so as to uniform the load on both sides of the standing frame 10. For example, in FIG. 2, the balancing weight 80 is a sleeve structure which is slidable on the balancing rod 70. Optionally, the balancing weight 80 may be in other shapes as needed, which is not limited to that in FIG. 2.

As shown in FIG. 1 to FIG. 6, as an embodiment, the top base 20 includes a first base 20a and a second base 20b which is operable to pivot relative to the first base 20a, the first base 20a is fixed on a top of the standing frame 10, the fixed part 41 is connected with the second base 20b, the end of the balancing rod 70 is hinged with the second base 20b, and the second base 20b is provided with the passage 12 for the rope 60. With the help of the first base 20a and the second base 20b, the second base 20b when operated may actuate the telescopic member 40, the installing support 30, the shooting apparatus 200, the guide wheel 50 and the rope 60 to pivot upward or downward relative to the first base 20a, for example, in a range of 180 degrees. In such a way, it is convenient for the user to adjust the position of the shooting apparatus 200 on the installing support 30, and it is also convenient for the user to fold the telescopic part 40 together with the guide wheel 50 relative to the standing frame 11.

Furthermore, an angle adjusting assembly 90 is provided between the telescopic part 42 and the installing support 30, and the angle adjusting assembly 90 includes a first fitting piece 91 and a second fitting piece 92, the first fitting piece 91 is fixed at an end of the telescopic part 42, the second fitting piece 92 is connected to the installing support 30, and the end of the rope 60 is connected to the first fitting piece 91. In such a way, the rope 60 is indirectly connected to the telescopic part 41 through the first fit piece 91. The position of the installing support 30 together with the shooting apparatus 200 may be manually adjusted due to the presence of the angle adjusting assembly 90, for example, the position of the installing support 30 and the shooting apparatus 200 shown in FIG. 3 may be adjusted to that shown in FIG. 4. Understandably, the second base 20b may be operated to pivot relative to the first base 20a, and a fastener, such as a screw, is configured between the second base 20b and the first base 20a. When it's unnecessary to pivot the second base 20b about the first base 20a, the fastener will lock the first base 20a and the second base 20b; when there is a need to adjust, the second base 20b may be operated manually to pivot about the first base 20a. In addition, the principle of the angle adjusting assembly 90 may be similar to or the same with that of the second base 20b, which will not be repeated here.

Figure 7:
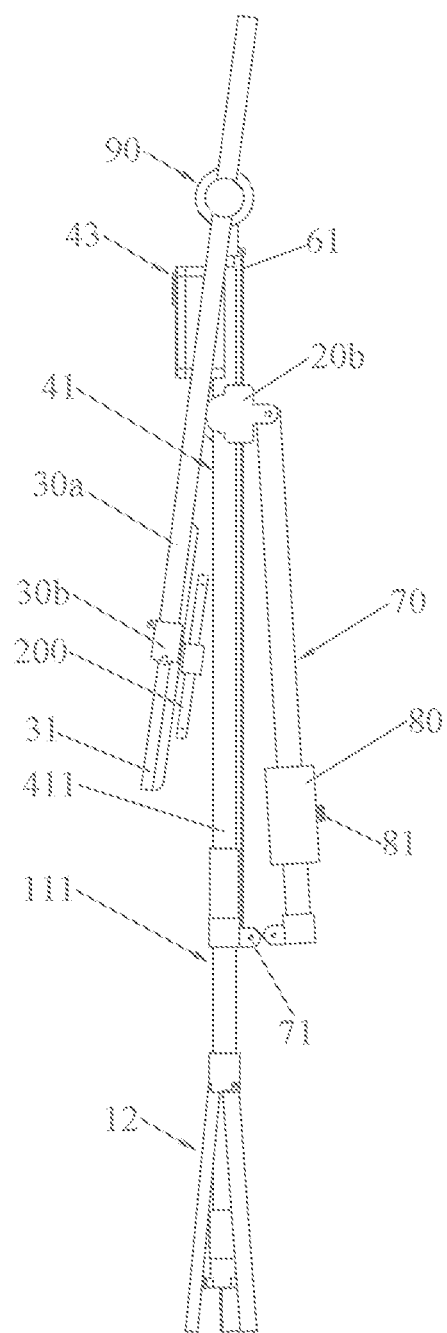
FIG. 7 illustrates a folding state of the shooting stand with a balancing weight according to one embodiment of the invention.

As shown in FIG. 1 to FIG. 7, as an embodiment, the standing frame 10 includes a telescopic rod 11 and a tripod 12 for supporting the telescopic rod 11. The telescopic rod 11 has a main part 111 and a sliding part 112 that can slide on the main part 111, the top base 20 is connected with the sliding part 112, and the tripod 12 is connected with the main part 111. With the help of the telescopic rod 11, the height position of the telescopic member 40 may be adjusted flexibly. Specifically, as an embodiment, the telescopic rod 11 and the telescopic member 40 are electric push rods, in such a way, the height position of the telescopic member 40 can be adjusted electrically, and the position of the installing support 30 and the shooting apparatus 200 may also be adjusted electrically. Additionally, a box 43 for installing a battery and a controller is provided at the fixed part 111 near the top base 20, and the box 43 is electrically connected with the electric push rods. With the help of the box 43, a battery of large capacity may be built in to meet the needs of users for outdoor use. Optionally, an external power adapter may be connected to use external power. In addition, the box 43 may also be placed with a controller which is for controlling the work of the electric push rods and the operation of the shooting apparatus 200. The structure and control principle of the controller are already well known in the art, which is not repeated here. Specifically, in FIG. 1 to FIG. 6, as an embodiment, the tripod 12 is a folding tripod, when unfolded as shown in FIG. 1 to FIG. 6, the tripod 12 is deployed far away from the main part 111 and arranged around a center of the main part 111, thereby improving the stability; when folded as shown in FIG. 7, the tripod 12 moves close to the main part 111, thereby reducing the occupied space to facilitate the carrying. It should be noted that, when the top base 20 includes the first base 20a and the second base 20b, the first base 20a is connected with the sliding part 112.

Referring to FIG. 1 to FIG. 7 again, as an embodiment, the installing support 30 includes a rod body 30a and a universal ball bracket 30b connected to the rod body 30b for mounting the shooting apparatus 200. Optionally, the rod body 30a may be slidable relative to the second fitting piece 92, for example, the rod body 30a is threaded through the second fitting piece 92. The universal ball bracket 30b is assembled at the end of the rod body 30a far away from the second fitting piece 92, so that the sliding stroke of the rod body 30a relative to the second fitting piece 92 is greater, so that the position of the universal ball bracket 30b and the shooting apparatus 200 may be adjusted during the movement of the rod body 30a. It's seen that, the shooting apparatus 200 may be adjusted in any angle with the help of the universal ball bracket 30b. It should be noted that, the rod body 30a may be connected to the second fitting piece 92 by a screw for example, to ensure the stable connection. By operating the screw, the rod body 30a may be locked or unlocked.

The folding process of the shooting stand of the present application is explained as follow. When there is a need to fold the shooting stand 100 in the state of FIG. 6 to the state of FIG. 7, the telescopic member 40, together with the installing support 30, the shooting apparatus 200, the box 43 and the guide wheel 50 are pivoted along the clockwise direction to a position close to the standing frame 10. After the pivoted action is in place, the installing support 30 and the shooting apparatus 200 are pivoted in the counterclockwise direction to the position close to the standing frame 10. After the installing support 30 and the shooting apparatus 200 are pivoted in place, the tripod 12 is folded, as shown the final state in FIG. 7, so as to facilitate the carrying of the shooting stand 100.

Compared with the prior art, the guide wheel 50 is provided on the cantilever arm 411, the end of the balancing rod 70 is hinged with the top base 20 and extended in the direction away from the top base 20 and beneath the cantilever arm 411, the rope 60 goes around the guide wheel 50, and one end of the rope 60 is connected with the telescopic part 42 or the installing support 30, and the other end of rope 60 is connected with the position of balancing rod 70 away from the top base 20. In such a configuration, when the telescopic part 42 is extended and slid relative to the fixed part 41, the rope 60 is pulled to cause the balancing rod 70 to pivot and swing to approach the cantilever arm 411; when the telescopic part 42 is retracted relative to the fixed part 41, the rope 60 is loosened to cause the balancing rod 70 to pivot or swing away from the cantilever arm 411 under an action of a dead weight thereof, and meanwhile the rope 60 is pulled tightly by the balancing rod 70. In such a way, the load on both sides of standing frame 10 can be balanced through the pivoting position of the balancing rod 70, which effectively ensures the uniform load on both sides of standing frame 10, thereby stabilizing the standing frame 10 to ensure the shooting effect of the shooting apparatus 200.

It is noted that, a ring fill light 31 may be installed on the installing support 30. Under the condition that the installing support 30 is equipped with the rod body 30*a* and universal ball bracket 30*b*, the ring fill light 31 is installed on the universal ball bracket 30 and configured around the shooting apparatus 200, so as to provide fill light to the scene where the light is insufficient. Filing light with other shapes may also be used as needed, which is not limited to that shown in FIG. 1 and FIG. 2. The ring fill light 31 is electrically connected to the box 43. In addition, the aforementioned controller can be provided with a built-in program and a wireless receiving module, a remote controller or a mobile phone may be used for the remote connection. The remote connection and control are well known in the art, which will not be described in detail therefore.

The above-mentioned embodiments only denote several embodiments of the present application, and the descriptions thereof are relatively specific and detailed, but should not be construed as limiting the scope of the patent application. It should be pointed out that for those skilled in the art, several modifications and improvements can be made without departing from the concept of the present application, which all belong to the protection scope of the present application. Therefore, the scope of protection of the patent of the present application shall be subject to the appended claims.

What is claimed is:

1. A shooting stand with a balancing weight, comprising a standing frame, a top base assembled on the standing frame, an installing support for fixing an external shooting apparatus, and a telescopic member, the telescopic member comprising a fixed part and a telescopic part on the fixed part, the fixed part being installed on the top base, and extended out of the top base along an opposite direction of the telescopic part to form a cantilever arm, the telescopic part being extended out of the top base and connected with the installing support, wherein the shooting stand further comprises a guide wheel, a rope and a balancing rod, the guide wheel is assembled on the cantilever arm, an end of the balancing rod is hinged with the top base, and the balancing rod is extended along a direction away from the top base and arranged beneath the cantilever arm, the rope goes around the guide wheel, one end of the rope is connected to the telescopic part or the installing support, and the other end of the rope is connected to the balancing rod away from the top base;

when the telescopic part is extended and slid relative to the fixed part, the rope is pulled to cause the balancing rod to pivot and swing to approach the cantilever arm; when the telescopic part is retracted relative to the fixed part, the rope is loosened to cause the balancing rod to pivot or swing away from the cantilever arm under an action of a dead weight thereof, and the rope is pulled to move while the balancing rod is pivoted or swung away from the cantilever arm.

2. The shooting stand according to claim 1, wherein the guide wheel is configured toward the balancing rod, the balancing rod has a mounting part toward the cantilever arm for mounting the rope, the rope goes around and above the guide wheel, the rope is located between the installing support and the guide wheel and is parallel with the telescopic member, and the top base is provided with a passage for allowing the rope to pass.

3. The shooting stand according to claim 2, wherein the guide wheel is located at an end of the cantilever arm away from the top base, and the guide wheel is arranged in a fixed or rolling manner.

4. The shooting stand according to claim 1, wherein a balancing weight is provided at a position of the balancing rod where is away from the top base.

5. The shooting stand according to claim 4, wherein the balancing weight is slidable on the balancing rod, and a fixing screw is provided on the balancing weight by which a position of the balancing weight can be fixed or adjusted.

6. The shooting stand according to claim 1, wherein the top base comprises a first base and a second base which is operable to pivot relative to the first base, the first base is fixed on a top of the standing frame, the fixed part is connected with the second base, the end of the balancing rod is hinged with the second base, and the second base is provided with a passage for allowing the rope to pass.

7. The shooting stand according to claim 1, wherein an angle adjusting assembly is provided between the telescopic part and the installing support, and the angle adjusting assembly comprises a first fitting piece and a second fitting piece, the first fitting piece is fixed at an end of the telescopic part, the second fitting piece is connected to the installing support, and the end of the rope is connected to the first fitting piece.

8. The shooting stand according to claim 1, wherein the standing frame comprises a telescopic rod and a tripod for supporting the telescopic rod, the telescopic rod has a main part and a sliding part on the main part, the top base is connected with the sliding part, and the tripod is connected with the main part.

9. The shooting stand according to claim 8, wherein both of the telescopic rod and the telescopic member are electric push rods, and a box for installing a battery and a controller is provided at the fixed part near the top base, and the box is electrically connected with the electric push rods.

10. The shooting stand according to claim 8, wherein the tripod is a folding tripod, when unfolded, the tripod is deployed away from the main part and arranged around a center of the main part; when folded, the tripod moves close to the main part.

* * * * *